(12) United States Patent (10) Patent No.: US 12,560,708 B2
Sasaki et al. (45) Date of Patent: Feb. 24, 2026

(54) OBJECT DETECTION DEVICE

(71) Applicant: Murata Manufacturing Co., Ltd., Nagaokakyo (JP)

(72) Inventors: Shinichi Sasaki, Nagaokakyo (JP); Takaaki Asada, Nagaokakyo (JP); Yuuma Watabe, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 219 days.

(21) Appl. No.: 18/614,786

(22) Filed: Mar. 25, 2024

(65) Prior Publication Data

US 2024/0255637 A1 Aug. 1, 2024

Related U.S. Application Data

(63) Continuation of application No. PCT/JP2023/007841, filed on Mar. 2, 2023.

(30) Foreign Application Priority Data

Jul. 29, 2022 (JP) ................................. 2022-121776

(51) Int. Cl.
*G01S 7/524* (2006.01)
*G01S 7/527* (2006.01)
*G01S 15/10* (2006.01)

(52) U.S. Cl.
CPC ............ *G01S 15/102* (2013.01); *G01S 7/524* (2013.01); *G01S 7/5276* (2013.01); *G01S 15/101* (2013.01)

(58) Field of Classification Search
CPC ...... G01S 7/524; G01S 15/101; G01S 15/102; G01S 15/931; G01S 7/52006;

(Continued)

(56) References Cited

U.S. PATENT DOCUMENTS 6,020,849 A * 2/2000 Fukuzaki ................ G06F 3/046
345/158
10,527,723 B2 * 1/2020 Bang ....................... G01S 7/527
(Continued)

FOREIGN PATENT DOCUMENTS

JP 2002079180 A 3/2002
JP 2002079181 A 3/2002
(Continued)

OTHER PUBLICATIONS

International Search Report in PCT/JP2023/007841, mailed Apr. 11, 2023, 3 pages.
(Continued)

*Primary Examiner* — Daniel L Murphy
*Assistant Examiner* — Amie M Ndure
(74) *Attorney, Agent, or Firm* — Keating & Bennett, LLP

(57) ABSTRACT

An object detection device includes a transmitter to generate an acoustic wave as a signal wave based on a predetermined transmission signal and transmit the signal wave toward an object, a receiver provided separately from the transmitter and to receive the acoustic wave to generate a reception signal, and a controller to generate the transmission signal to control the signal wave from the transmitter. The receiver has frequency characteristics such that the reception signal fluctuates when the receiver resonates. The transmission signal is set according to the frequency characteristics of the receiver to reduce or prevent a resonance of the receiver at a time of reception of the signal wave from the transmitter.

14 Claims, 14 Drawing Sheets

(58) Field of Classification Search
CPC .................. G01S 7/527; G01S 7/5276; H01L
27/1446; H01L 31/109
See application file for complete search history.

(56) References Cited

U.S. PATENT DOCUMENTS

| | | | | |
|---|---|---|---|---|
| 11,561,297 | B2 * | 1/2023 | Sasaki ..................... | G01S 7/521 |
| 2003/0154792 | A1 * | 8/2003 | Katayama ............. | G01S 15/872 |
| | | | | 73/602 |
| 2005/0245207 | A1 * | 11/2005 | Suzuki .................... | H04B 1/18 |
| | | | | 455/101 |
| 2010/0304692 | A1 * | 12/2010 | Lu ......................... | H04B 1/525 |
| | | | | 455/73 |
| 2015/0292879 | A1 | 10/2015 | Zhou et al. | |
| 2018/0067207 | A1 * | 3/2018 | Bang .................... | G01S 15/102 |
| 2020/0264302 | A1 | 8/2020 | Aoyama et al. | |
| 2020/0292683 | A1 * | 9/2020 | Sasaki ..................... | H04R 3/00 |
| 2023/0003668 | A1 * | 1/2023 | Yamada ................ | G01N 22/04 |

FOREIGN PATENT DOCUMENTS

| | | |
|---|---|---|
| JP | 2003307420 A | 10/2003 |
| JP | 2017508962 A | 3/2017 |
| JP | 2019086407 A | 6/2019 |
| WO | 2019159401 A1 | 8/2019 |

OTHER PUBLICATIONS

Written Opinion in PCT/JP2023/007841, mailed Apr. 11, 2023, 4 pages.

* cited by examiner

FIG. 3A    TRANSMISSION SIGNAL Sd                                    TIME

FIG. 3B    SIGNAL WAVE W1

FIG. 3C    RECEPTION SIGNAL Sr

T1        T2

OBJECT DETECTION DEVICE

CROSS REFERENCE TO RELATED APPLICATIONS

This application claims the benefit of priority to Japanese Patent Application No. 2022-121776 filed on Jul. 29, 2022 and is a Continuation application of PCT Application No. PCT/JP2023/007841 filed on Mar. 2, 2023. The entire contents of each application are hereby incorporated herein by reference.

BACKGROUND OF THE INVENTION

1. Field of the Invention

The present invention relates to object detection devices that each detect an object by transmitting and receiving an acoustic wave, such as an ultrasound wave.

2. Description of the Related Art

Japanese Unexamined Patent Application Publication No. 2019-086407 discloses a transmission-reception control device that controls transmission and reception in an ultrasonic sensor. The ultrasonic sensor includes an ultrasonic microphone configured to transmit a probe wave, which is an ultrasonic wave, and to receive a received wave. The transmission-reception control device sets the frequency of the probe wave to a transmission frequency different from the resonant frequency of the ultrasonic microphone, processes a reception result of the received wave that is based on the probe wave transmitted at the transmission frequency, and detects an object based on the processing result. This reduces the duration of reverberation in the ultrasonic microphone resulting from the transmission of the probe wave compared to a case in which the transmission frequency is the resonant frequency. Thus, the transmission-reception control device is intended to reduce the adverse effects resulting from the reverberation in the ultrasonic sensor as much as possible.

In Japanese Unexamined Patent Application Publication No. 2019-086407, it is assumed that the ultrasonic microphone, which transmits the probe wave, is also configured to receive a reflected wave. The inventors of example embodiments of the present invention discovered a new problem that does not occur in the related-art configuration in the detection of an object by the transmission and reception of acoustic waves, and developed example embodiments of the present invention to solve the problem.

SUMMARY OF THE INVENTION

Example embodiments of the present invention provide object detection devices that are each able to prevent a situation in which the detection of an object by the transmission and reception of acoustic waves becomes difficult due to the influence of a received acoustic wave.

An example embodiment of the present invention provides an object detection device to detect an object by transmitting and receiving an acoustic wave. The object detection device includes a transmitter to generate the acoustic wave as a signal wave based on a predetermined transmission signal and transmit the signal wave toward the object, a receiver provided separately from the transmitter and to receive the acoustic wave to generate a reception signal, and a controller configured or programmed to generate the transmission signal to control the signal wave from the transmitter. The receiver has frequency characteristics such that the reception signal fluctuates when the receiver resonates, and the transmission signal is set according to the frequency characteristics of the receiver to reduce or prevent resonance of the receiver at a time of reception of the signal wave from the transmitter.

Example embodiments of the present invention are each able to prevent a situation in which the detection of an object by the transmission and reception of acoustic waves becomes difficult due to the influence of a received acoustic wave.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Object detection devices according to example embodiments of the present invention are described below with reference to the accompanying drawings.

The example embodiments are examples, and portions of a configuration described in one example embodiment may be replaced or combined with portions of a configuration in a different example embodiment. In second and subsequent example embodiments, descriptions of features that are the same or substantially the same as those in a first example embodiment are omitted, and only features different from the first example embodiment are described. In particular, the description of the same or substantially the same advantageous effects provided by the same or corresponding features is not repeated for each example embodiment.

First Example Embodiment

A configuration and advantageous operations of an object detection device according to a first example embodiment of the present invention are described below.
1. Configuration
1-1. Outline The outline of the object detection device according to the first example embodiment is described with reference to FIG. 1.

Figure 1:
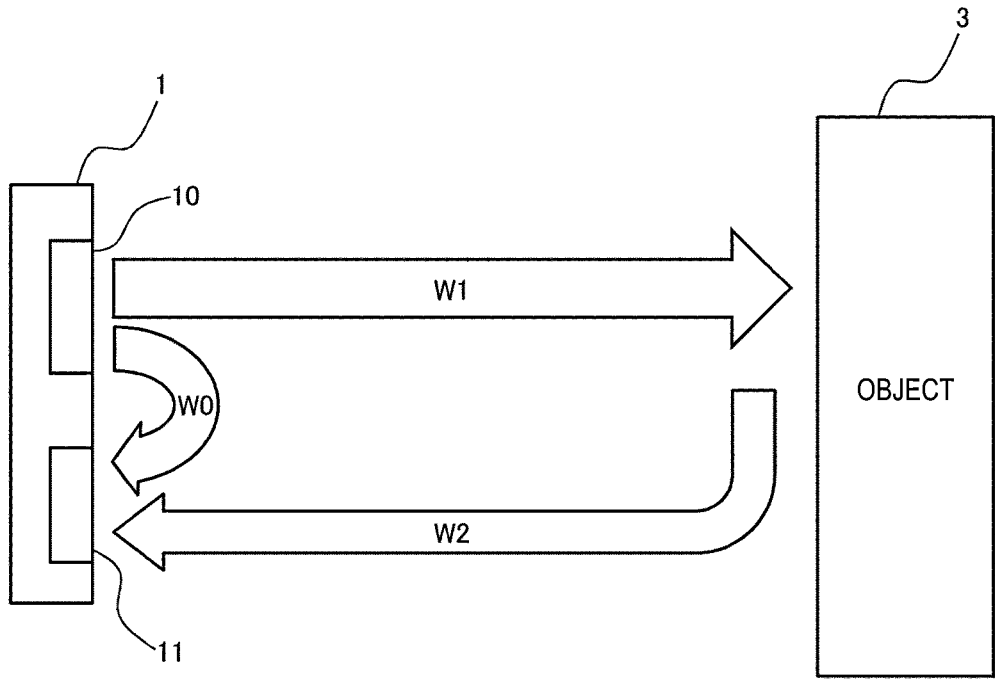
FIG. 1 is a diagram illustrating an outline of an object detection device according to an example embodiment of the present invention.

FIG. 1 is a diagram illustrating the outline of an object detection device 1 according to the present example embodiment. The object detection device 1 detects the distance to an object 3 by transmitting and receiving acoustic waves, such as ultrasonic waves, for example.

The object detection device 1 of the present example embodiment is applicable to various applications to detect various types of objects 3. For example, in an application in which the object detection device 1 is mounted on a mobile body, such as a robot arm or a robot hand, the object detection device 1 can detect the distance to a nearby object 3, such as an object to be grasped. Also, the object detection device 1 can be used for various types of mobile bodies, such as, for example, a robot vacuum cleaner, an automated guided vehicle, and a personal mobility vehicle. For example, the object detection device 1 can detect the distance to the object 3 near the mobile body, whether an obstacle is present, and a road surface condition. Furthermore, the object detection device 1 can be used for various applications other than applications for mobile bodies.

The object detection device 1 detects the object 3 by transmitting a signal wave W1, which is an acoustic wave the signal waveform of which is predetermined, for each detection application, from a transmitter 10 toward the object 3 and receiving a reflected wave W2 of the signal wave W1 reflected from the object 3 with a receiver 11 provided separately from the transmitter 10. In this case, the signal wave W1 from the transmitter 10 also directly reaches the receiver 11 as a direct wave W0 without being reflected by the object 3.

Figure 2:
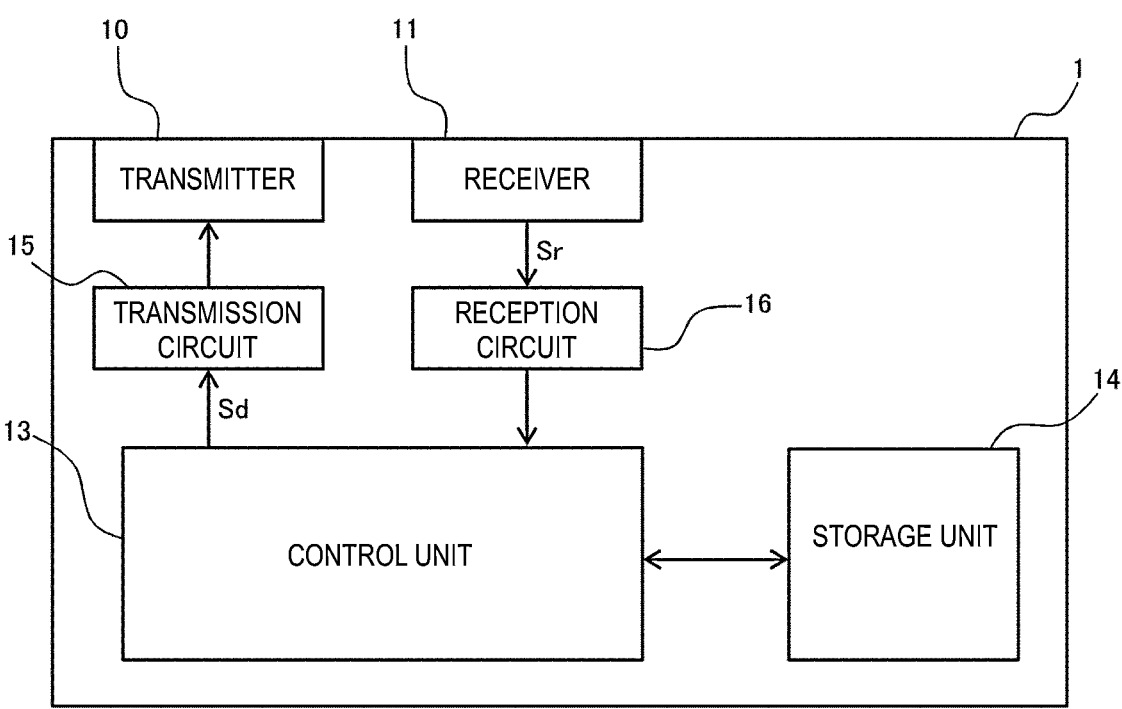
FIG. 2 is a block diagram illustrating a configuration of an object detection device according to an example embodiment of the present invention.

The inventors of example embodiments of the present invention discovered a new problem by diligently studying the influence of the direct wave W0, which is specific to the configuration including the transmitter 10 and the receiver 11 as separate components, on close-range detection of the object 3. To solve this new problem, through diligent research, the inventors of example embodiments of the present invention developed the object detection device 1 of the present example embodiment that can reduce or prevent the influence of the direct wave W0. A configuration of the object detection device 1 of the present example embodiment is described below.
1-2. Device Configuration A configuration of the object detection device 1 of the present example embodiment is described with reference to FIG. 2. FIG. 2 is a block diagram illustrating a configuration of the object detection device 1 of the present example embodiment.

As illustrated in FIG. 2, the object detection device 1 of the present example embodiment includes, for example, a transmitter 10, a receiver 11, a controller 13, a storage 14, a transmission circuit 15, and a reception circuit 16. The transmitter 10 and the receiver 11 are arranged at a distance from each other on, for example, the same major surface of a substrate. The distance between the transmitter 10 and the receiver 11 may be measured as a distance between reference positions, such as the central position of the transmitter 10 and the central position of the receiver 11.

The transmitter 10 may include, for example, a thermophone, which is an acoustic wave source that generates an acoustic wave, such as an ultrasonic wave, by heating air and stopping the heating of air. The thermophone generates, as the signal wave W1 (see FIG. 3B), an acoustic wave that is a pressure wave generated as a result of expanding the surrounding air by starting the heating and contracting the surrounding air by stopping the heating. With the transmitter 10 including a thermophone, it is possible to control an acoustic wave by generating heat and stopping the generation of heat without using resonance and to easily prevent reverberation during wave transmission. Also, using a thermophone makes it easier to increase the bandwidth of an acoustic wave and reduce the size and weight of the transmitter 10.

The transmission circuit 15 is a drive circuit for the transmitter 10 and drives the transmitter 10 based on, for example, a transmission signal Sd input from the controller 13. For example, when the transmitter 10 is a thermophone, the transmission circuit 15 may include a switching transistor, a capacitor, and an inductor and turns on and off an electric current supplied to the thermophone according to the transmission signal Sd.

For example, the time length, the intensity, the time interval, the frequency band, and the directivity of an acoustic wave generated by the transmitter 10 may be set by the transmission circuit 15. Some or all of the functions of the transmission circuit 15 may be integrated into the transmitter 10 or the controller 13. The transmission signal Sd may be supplied from the transmission circuit 15 to the transmitter 10 as a driving signal for the transmitter 10 or may be supplied directly from the controller 13 to the transmitter 10.

The receiver 11 may include, for example, a microphone element, such as a micro electro mechanical systems (MEMS) microphone. The receiver 11 has frequency characteristics to resonate with a structural component, such as a cap (see, for example, FIG. 4). The receiver 11 may include multiple microphone elements that are, for example, the same type of products having common frequency characteristics. The frequency characteristics of the receiver 11 may vary within an acceptable error range.

The receiver 11 receives an acoustic wave from the outside and generates a reception signal Sr indicating the reception result. The receiver 11 is not limited to including a MEMS microphone and may include, for example, any other type of microphone element that has frequency characteristics suitable to receive an ultrasonic wave transmitted from the transmitter 10. For example, a capacitor microphone may be used for the receiver 11. The receiver 11 may be non-directional or may have any type of directivity as appropriate.

The reception circuit 16 includes, for example, a sensor amplifier that amplifies the reception signal Sr from the receiver 11 and outputs the reception signal Sr generated in a predetermined dynamic range to the controller 13. The reception circuit 16 may include various drive circuits for the receiver 11. Some or all of the functions of the reception circuit 16 may be integrated into the receiver 11 or the controller 13.

The controller 13 is configured or programmed to control the entire operation of the object detection device 1. The controller 13 includes, for example, a microcomputer and performs predetermined functions in cooperation with software. The controller 13 reads data and programs stored in the storage 14 and performs various types of arithmetic processing to provide various functions. For example, the controller 13 generates, based on data about a signal waveform stored in the storage 14, the transmission signal Sd to cause the transmitter 10 to generate the signal wave W1 and outputs the transmission signal Sd to the transmission circuit 15. The controller 13 also includes a calculation function to detect the object 3 based on the reception signal Sr from the reception circuit 16.

The controller 13 may instead be a hardware circuit, such as a dedicated electronic circuit designed to provide predetermined functions or a reconfigurable electronic circuit, for example. The controller 13 may also be, for example, any of various semiconductor integrated circuits, such a CPU, an MPU, a DSP, a FPGA, and an ASIC. Also, the controller 13 may include, for example, an analog-to-digital (A/D) converter and a digital-to-analog (D/A) converter.

The storage 14 is a storage medium, such as, for example, a flash memory, that stores programs and data necessary to implement the functions of the controller 13. For example, the storage 14 stores data representing the transmission signal Sd. The storage 14 may also be an internal memory of the controller 13.

2. Operations

Operations of the object detection device 1 configured as described above are described below.

Figure 3:
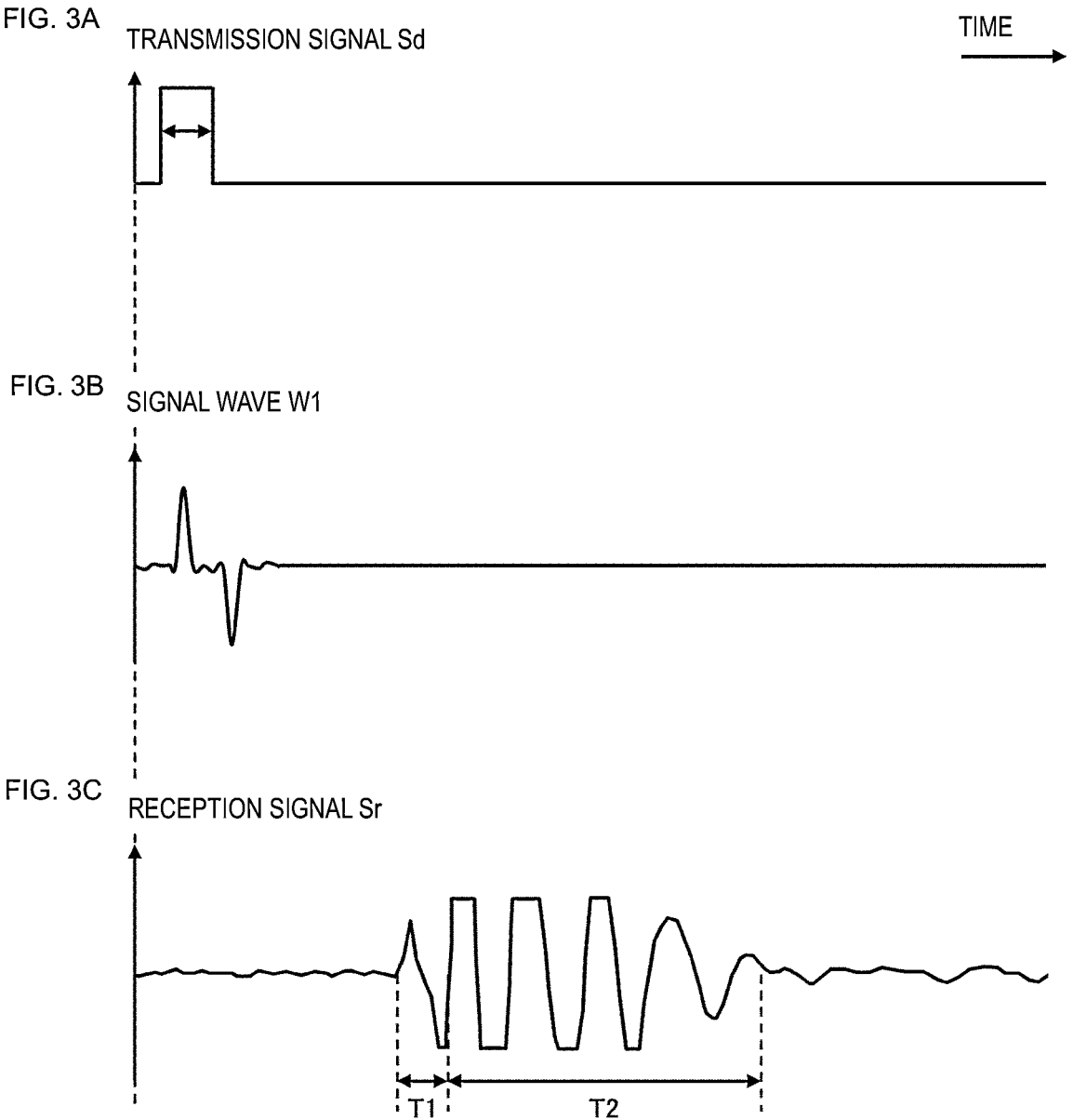
FIGS. 3A to 3C are diagrams for describing a problem of ringing in an object detection device according to an example embodiment of the present invention.

In the object detection device 1 of the present example embodiment, the controller 13 generates the transmission signal Sd to control the transmission circuit 15 to cause the transmitter 10 to generate the corresponding signal wave W1 (see FIGS. 3A and 3B). In the present example embodiment, each pulse of the transmission signal Sd has an impulse waveform that defines the signal wave W1.

The signal wave W1 from the transmitter 10 becomes the reflected wave W2 as a result of being transmitted to the object 3 or becomes the direct wave W0 that is not reflected by the object 3. In the object detection device 1, the receiver 11 receives acoustic waves, such as the reflected wave W2 and the direct wave W0, generates the reception signal Sr indicating the reception result, and outputs the reception signal Sr to the controller 13 via, for example, the reception circuit 16.

Based on the reception signal Sr from the receiver 11, the controller 13 detects the timing at which the reflected wave W2 from the object 3 is received by performing threshold determination based on signal intensity and measures a distance according to a time of flight (TOF) method. For example, the controller 13 measures the period from the transmission timing of the signal wave W1 to the detected reception timing as the round-trip time of the signal wave W1 between the object detection device 1 and the object 3 and calculates the distance to the object 3 by conversion based on, for example, the acoustic velocity.

With the operations of the object detection device 1 described above, the distance to the object 3 can be detected by simple signal processing in which the TOF ranging method is applied to the transmission and reception of the signal wave W1 that is based on the transmission signal Sd with the impulse waveform. The object detection operation according the present example embodiment is useful, for example, for close-range object detection in which the sound pressure of the reflected wave W2 is likely to be maintained.

2-1. Influence of Direct Wave

In the object detection operation as described above, when the reflected wave W2 is received from the object 3 at a relatively short distance, due to the reception of the direct wave W0, there may be a period in which it is difficult to distinguish between the reflected wave W2 and the direct wave W0 in the reception signal Sr and it is difficult to detect the object 3. The object detection device 1 of the present example embodiment can control the signal wave W1 to reduce the period in which detection is difficult and thus makes it possible to detect the object 3 in a shorter distance range.

As a measure to achieve the above purpose, for example, the transmission signal Sd with the impulse waveform (see FIG. 3A) is used. Compared with a case in which a pulse with the same or substantially the same waveform is repeated multiple times in the signal wave W1, using the transmission signal Sd makes it possible to reduce the period in which the direct wave W0 is received by the receiver 11. Also, using a thermophone for the transmitter 10 makes it possible to prevent reverberation in the signal wave W1 resulting from, for example, the resonance of the transmitter 10 (see FIG. 3B) and to reduce the reception period of the direct wave W0 considering even the reverberation at the time of transmission.

2-1-1. Problem of Ringing

It is considered that the influence of the direct wave W0 in close-range detection can be reduced to some extent with the above measures. However, a new problem in which the direct wave W0 still influences close-range detection despite the above measures was discovered by diligent research conducted by the inventors of example embodiments of the present invention. This problem is described with reference to FIGS. 3A to 3C.

FIG. 3A shows the transmission signal Sd in the object detection device 1. FIG. 3B shows the signal wave W1 transmitted from the transmitter 10 and corresponding to the transmission signal Sd of FIG. 3A. FIG. 3C shows the reception signal Sr received by the receiver 11 and corresponding to the signal wave W1 of FIG. 3B.

Figures 7A, 7B, 7C, 7D:
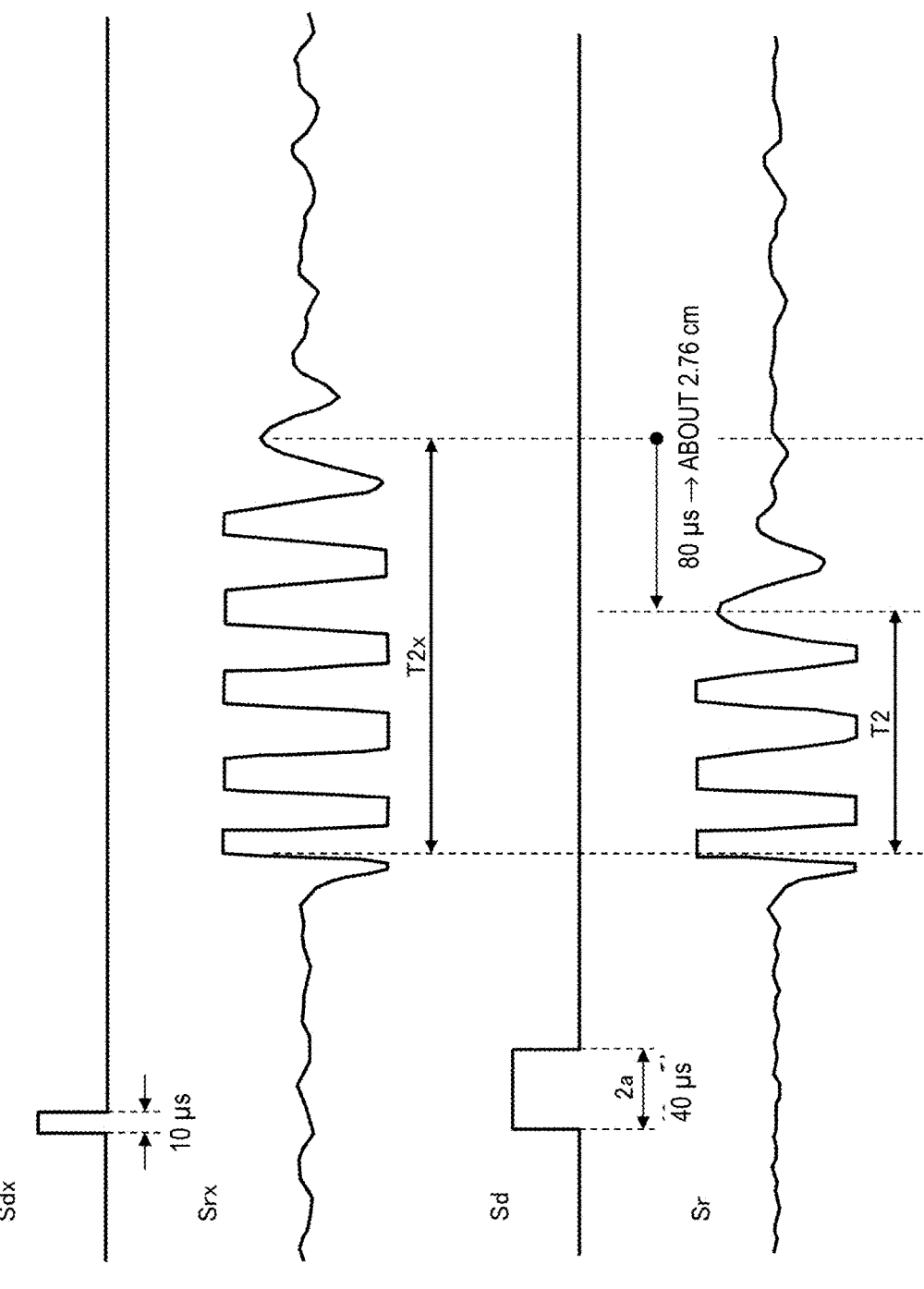
FIGS. 7A to 7D are graphs showing an example of a result of an experiment on the operation of an object detection device according to an example embodiment of the present invention.

In the reception signal Sr of FIG. 3C, a ringing period T2 is present after a period T1 in which the signal wave W1 (FIG. 3B) transmitted based on the transmission signal Sd of FIG. 7A is received as the direct wave W0 (FIG. 1). The ringing period T2 is a period in which ringing occurs. The ringing indicates a phenomenon in which the reception signal Sr unstably fluctuates when the receiver 11 resonates upon receiving the direct wave W0.

The ringing period T2 in FIG. 3C has a time length that is longer than, for example, the time length of the signal wave W1 (FIG. 3B). During the ringing period T2, it is difficult to detect the reflected wave W2 even when the reflected wave W2 is received. Thus, through diligent research, the inventors of example embodiments of the present invention newly discovered the problem in which the detection of the object 3 at a relatively short distance becomes difficult due to the influence of ringing in which the reception signal Sr becomes unstable as a result of the resonance of the receiver 11 at the time of reception of the direct wave W0.

2-2. Setting of Impulse Waveform

The inventors of example embodiments of the present invention diligently studied the problem of ringing caused by the reception of the direct wave W0 and thus developed the object detection device 1 of the present example embodiment. In the object detection device 1 of the present example embodiment, the impulse waveform of the transmission signal Sd is set considering the frequency characteristics of the receiver 11 to reduce the ringing period T2 caused by the reception of the direct wave W0. This is described with reference to FIGS. 4 through 11.

Figure 4:
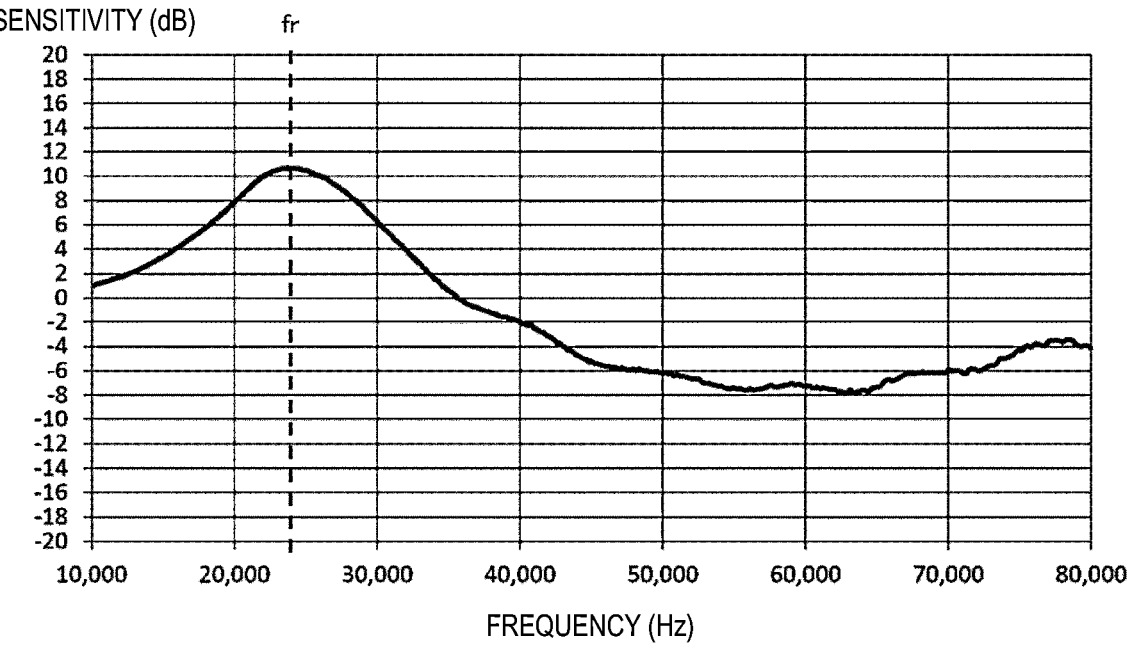
FIG. 4 is a diagram illustrating an example of frequency characteristics of a receiver of an object detection device according to an example embodiment of the present invention.

FIG. 4 shows an example of frequency characteristics of the receiver 11 of the object detection device 1. This example shows the frequency characteristics when, for example, a microphone SPU0410LR5H manufactured by Knowles Electronics, LLC is used for the receiver 11. In FIG. 4, the horizontal axis indicates the frequency, and the vertical axis indicates the sensitivity. In the example of FIG. 4, a peak in the frequency characteristics appears when a resonant frequency fr of the receiver 11 is, for example, about 25 kHz.

Figure 5:
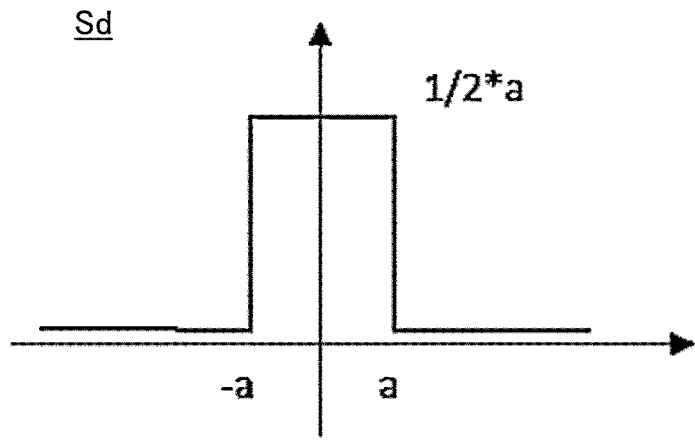
FIG. 5 is a diagram illustrating an example of an impulse waveform of a transmission signal in an object detection device according to an example embodiment of the present invention.

FIG. 5 illustrates an example of an impulse waveform of the transmission signal Sd. In this example, the pulse width, which is a parameter indicating the time length of the impulse waveform of the transmission signal Sd, is set at "2a". The pulse width "2a" is an example of a signal length indicating the time length of one signal wave W1. A frequency spectrum, in which the transmission signal Sd is expanded into components for respective frequencies f, is expressed by, for example, formula (1) below.

$$G(f) = \sin(2\pi a * f)/(2\pi a * f) \tag{1}$$

Figure 6:
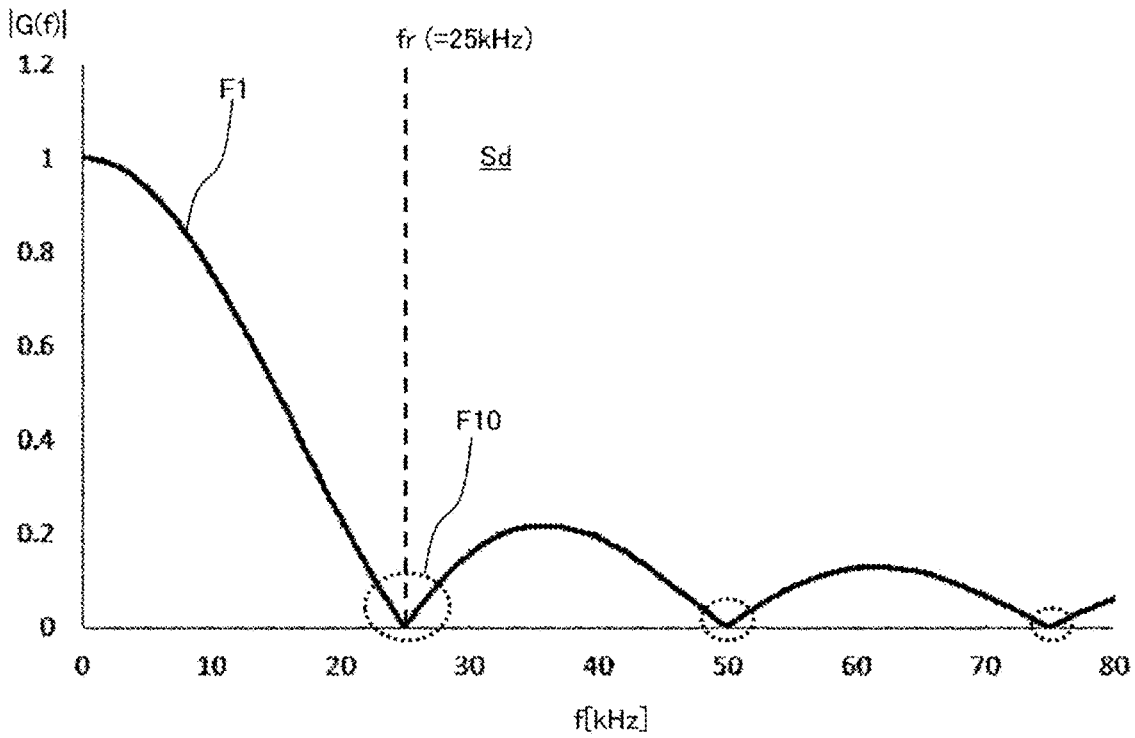
FIG. 6 is a diagram illustrating an example of a frequency spectrum of a transmission signal in an object detection device according to an example embodiment of the present invention.

In formula (1) above, sin ( ) indicates a sine function, and n indicates pi. FIG. 6 shows a frequency spectrum of the transmission signal Sd with the impulse waveform as described above.

In the example of FIG. 6, the pulse width "2a" is set to, for example, about 40 μs considering the frequency characteristics of the receiver 11 shown in FIG. 4. In a frequency spectrum F1 of the transmission signal Sd with the impulse waveform, frequency f=0 Hz is the maximum, and the intensity |G(f)| of the frequency component fluctuates and decreases as the frequency f increases. The frequency spectrum F1 includes nodes F10 arranged at a predetermined interval (½a) corresponding to the pulse width "2a". In each node F10, the intensity |G(f)| decreases to a value close to zero. In the present example embodiment, the node F10 is used to reduce or prevent a frequency component G (f=fr) with the resonant frequency fr of the receiver 11 in the transmission signal Sd.

For example, in the object detection device 1 of the present example embodiment, the pulse width "2a" of the transmission signal Sd is set based on the frequency spectrum F1 and the resonant frequency fr of the receiver 11 as indicated by formula (2) below.

$$2a = 1/fr \tag{2}$$

According to the setting by formula (2), the pulse width "2a" of the transmission signal Sd matches a period 1/fr corresponding to the resonant frequency fr. In this case, as illustrated in FIG. 6, in the frequency spectrum F1 of the transmission signal Sd, the intensity |G(fr)| of the frequency component with the resonant frequency fr of the receiver 11 can be reduced to zero or substantially zero along with its harmonic wave. The advantageous effects of this setting are described with reference to FIGS. 7A to 7D.

FIGS. 7A through 7D are graphs showing an example of the result of an experiment on the operation of the object detection device 1. The inventors of example embodiments of the present invention conducted an experiment to confirm the advantageous effect of considering the frequency characteristics of the receiver 11 of the object detection device 1. The receiver 11 with the frequency characteristics shown in FIG. 4 was used. The distance between the transmitter 10 and the receiver 11 was set at about 35 mm.

FIG. 7A shows an example of a signal waveform of a transmission signal Sdx used when the frequency characteristics of the receiver 11 are not considered. FIG. 7B shows a signal waveform of the reception signal Sr corresponding to the transmission signal Sdx shown in FIG. 7A. The transmission signal Sdx of FIG. 7A has a pulse width of about 10 μs with respect to the resonant frequency fr shown in FIG. 4, and this pulse width differs significantly from that obtained according to formula (2) above. In the reception signal Srx, as shown in FIG. 7B, a long ringing period T2x is observed from the time of reception of the direct wave W0.

In contrast, in the object detection device 1 of the present example embodiment, the signal waveform of the transmission signal Sd is set considering the frequency characteristics of the receiver 11. FIG. 7C shows an example of a signal waveform of the transmission signal Sd of the object detection device 1 of the present example embodiment. FIG. 7D shows an example of a signal waveform of the reception signal Sr corresponding to the transmission signal Sdx of FIG. 7A.

In the operation example shown in FIGS. 7C and 7D, the pulse width "2a" of the transmission signal Sd was set to about 40 μs according to the frequency characteristics shown in FIG. 4. While the pulse width "2a" of the transmission signal Sd of this example is longer than the example shown in FIG. 7A, the pulse width "2a" satisfies formula (2) with respect to the resonant frequency fr of the receiver 11 shown in FIG. 4 as an example.

With the object detection device 1 of the present example embodiment, as illustrated in FIG. 7D, the ringing period T2 caused by the reception of the direct wave W0 is reduced by about 80 μs from the example shown in FIG. 7B. Thus, it was confirmed that, compared to the operation example of FIGS. 7A and 7B, reducing the influence of ringing caused by the reception of the direct wave W0 makes it easier to detect an object at a short distance by about 2.76 cm that is a distance obtained by converting the reduced amount of time of the ringing period T2.

The object detection device 1 of the present example embodiment is not limited to the above example, and the pulse width "2a" of the transmission signal Sd may be set to various values taking into account the frequency characteristics of the receiver 11. For example, the transmission signal Sd of the present example embodiment does not have to strictly satisfy equation (2) and may satisfy equation (2) within an acceptable error range. The node F10 of the frequency spectrum may be defined to include such an acceptable range. The acceptable range is described with reference to FIG. 8.

Figure 8:
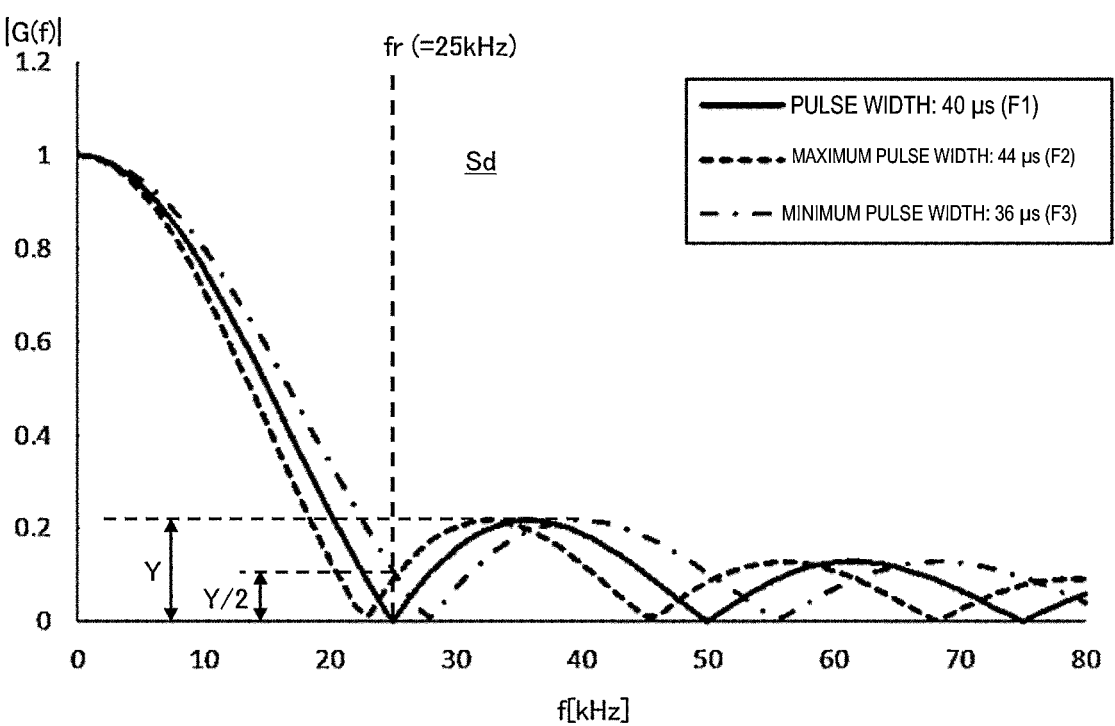
FIG. 8 is a diagram illustrating an example of settings of a transmission signal in an object detection device according to an example embodiment of the present invention.

FIG. 8 shows a maximum frequency spectrum F2 and a minimum frequency spectrum F3 indicating the upper and lower limits of the acceptable range of equation (2) with respect to the frequency characteristics shown in FIG. 4. In this example, the pulse width "2a" of the maximum frequency spectrum F2 is about 44 μs, and the pulse width "2a" of the minimum frequency spectrum F3 is about 36 μs.

For example, the allowable range of the pulse width "2a" of formula (2) may be within about ±10% of the period 1/fr corresponding to the resonant frequency fr. In this case, the intensity |G(fr)| of the frequency component with the resonant frequency fr in the transmission signal Sd can be reduced to, for example, about 50% or less of a second peak value Y in the frequency spectra F1 to F3 as shown in FIG. 8, and the influence of the direct wave W0 can be reduced or prevented.

Alternatively, in the present example embodiment, the pulse width "2a" may be set to a value that is about 80% or more of the period 1/fr corresponding to the resonant frequency fr. This makes it possible to reduce the influence of the direct wave W0 to a level less than or equal to the second peak value Y in the frequency spectra F1 to F3. Also, instead of formula (2), the object detection device 1 of the present example embodiment may be configured to satisfy, within an acceptable error range, formula (3) below with respect to an integer M greater than or equal to two.

$$2a = M/fr \tag{3}$$

That is, the pulse width "2a" may be set such that the resonant frequency fr of the receiver 11 is included in any of multiple nodes F10 (FIG. 6) in the frequency spectra F1 to F3. This setting also makes it possible to reduce the intensity |G(fr)| of the frequency component with the resonant frequency fr in the transmission signal Sd and reduce or prevent the influence of the direct wave W0.

Also, in the object detection device 1 of the present example embodiment, the setting of the transmission signal Sd as described above may be applied to various frequency characteristics of the receiver 11. Such a variation is described with reference to FIGS. 9 and 10.

Figure 9:
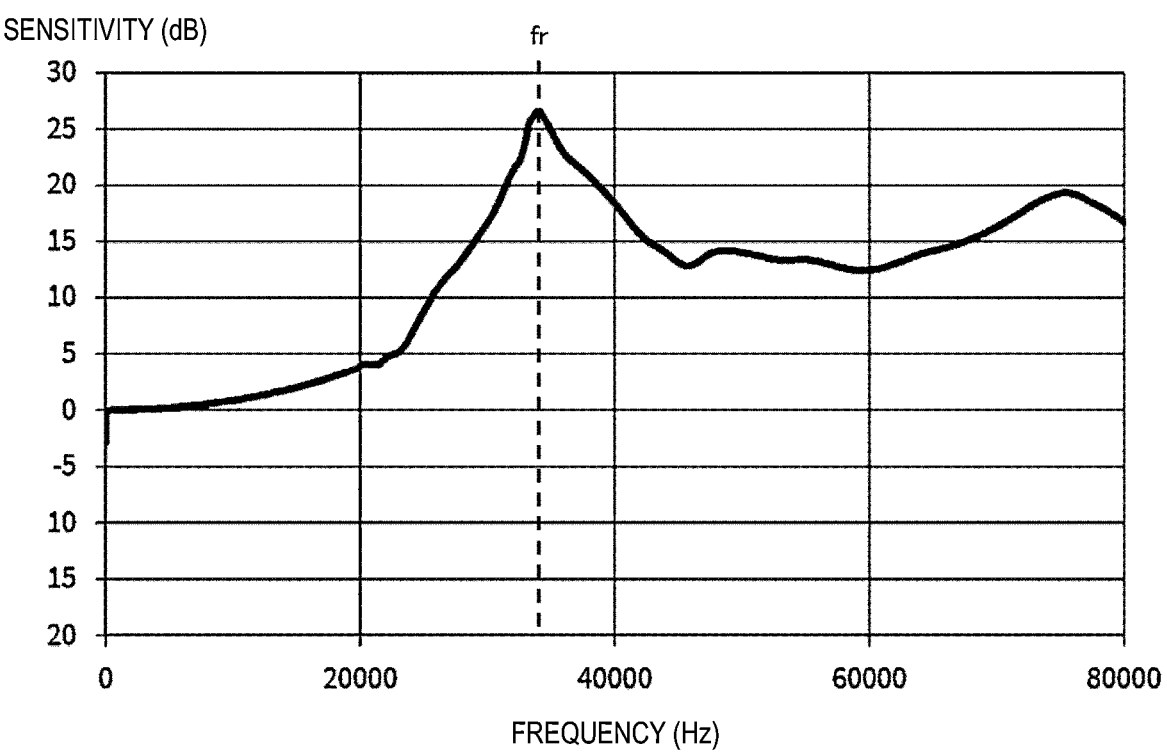
FIG. 9 is a diagram illustrating another example of frequency characteristics of a receiver of an object detection device.
Figure 10:
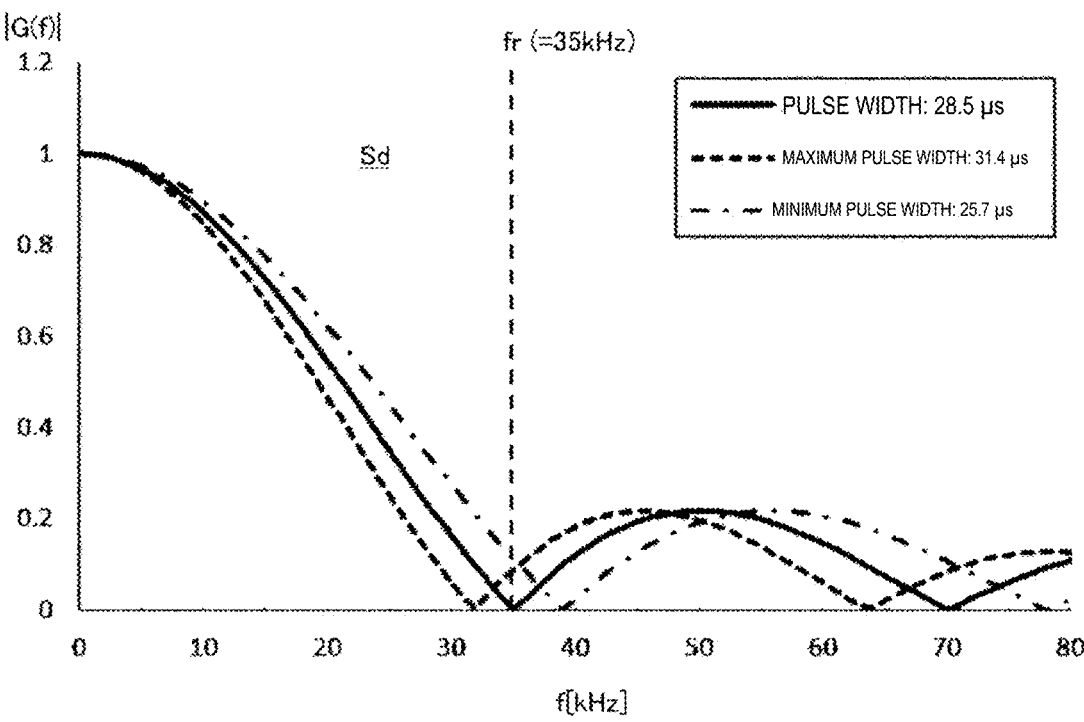
FIG. 10 is a drawing illustrating another example of settings of a transmission signal in an object detection device according to an example embodiment of the present invention.

FIG. 9 shows another example of the frequency characteristics of the receiver 11 of the object detection device 1. FIG. 10 shows another example of the setting of the transmission signal Sd according to the frequency characteristics shown in FIG. 9.

FIG. 9 shows an example of frequency characteristics observed when a microphone IM73A135V01 manufactured by Infineon Technologies AG is used for the receiver 11. According to the frequency characteristics shown in FIG. 9, the resonant frequency fr of the receiver 11 is considered to be around 35 kHz. In this case, in the object detection device 1 of the present example embodiment, for example, the pulse width "2a" of the transmission signal Sd is set to about 28.5 μs (see formula (2)), and the ±10% allowable range is set to a range greater than or equal to about 26.7 μs and less than or equal to about 31.4 μs as shown in FIG. 10. Within this allowable range, the intensity of the frequency component with the resonant frequency fr can be sufficiently reduced as shown in FIG. 10.

FIGS. 11A through 11D show a result of a confirmation experiment conducted using the receiver 11 of a variation. In this experiment, the same experimental procedure as that shown in FIGS. 7A through 7D was performed using a microphone IM73A135V01 of Infineon Technologies AG as the receiver 11. In the frequency characteristics actually observed in the experiment, the receiver 11 resonated at a resonant frequency of about 21 kHz.

Figures 11A, 11B, 11C, 11D:
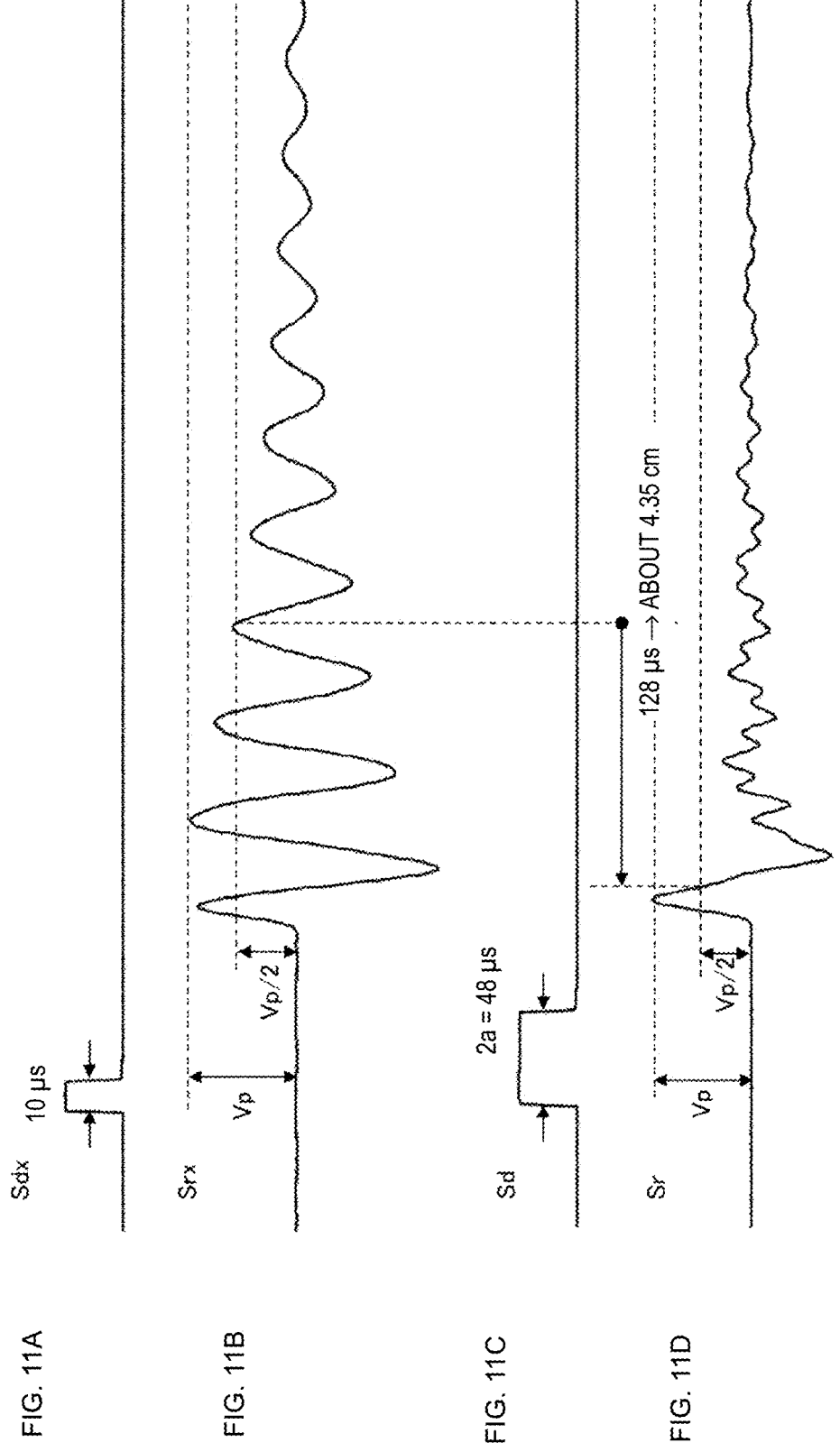
FIGS. 11A to 11D are graph showings another example of a result of an experiment on the operation of an object detection device according to an example embodiment of the present invention.

FIGS. 11A and 11B show the transmission signal Sdx with the pulse width "2a" and the corresponding reception signal Srx that are similar to those shown in FIGS. 7A and 7B. In this case, the reception signal Srx has a long ringing period that lasts until an intensity Vp resulting from the reception of the direct wave W0 is halved.

FIGS. 11C and 11D show the transmission signal Sd and the reception signal Sr in the object detection device 1 of the present example embodiment. In FIGS. 11C and 11D, the same receiver 11 as that used in FIGS. 11A and 11B was used, and the pulse width "2a" was set to about 48 μs according to the actually confirmed frequency characteristics (see formula (2)).

With the object detection device 1 of the present example embodiment, for example, as shown in FIG. 11D, the ringing period is reduced by about 128 μs from the example shown in FIG. 11B. Compared to the example shown in FIGS. 11A and 11B, the object detection device 1 of the present example embodiment can more easily perform close-range object detection in a distance range up to about 4.35 cm in terms of distance.

3. Summary

As described above, the object detection device 1 of the present example embodiment detects the object 3 by transmitting and receiving acoustic waves. The object detection device 1 includes the transmitter 10, the receiver 11, and the controller 13. The transmitter 10 generates an acoustic wave as the signal wave W1 based on the predetermined transmission signal Sd and transmits the signal wave W1 to the object 3. The receiver 11 is provided separately from the transmitter 10 and receives acoustic waves including the reflected wave W2 of the signal wave W1 from the object 3 and the direct wave W0 of the signal wave W1 to generate the reception signal Sr. The transmission signal Sd is generated to control the signal wave W1 transmitted from the transmitter 10. The receiver 11 has frequency characteristics such that the reception signal Sr fluctuates when the receiver 11 resonates (see FIG. 4). The transmission signal Sd is set according to the frequency characteristics of the receiver 11 (see FIG. 6) to reduce or prevent the resonance of the receiver 11 at the time of reception of the signal wave W1 from the transmitter 10.

The object detection device 1 described above can prevent a situation in which ringing caused by the resonance of the receiver 11 is prolonged when, for example, the signal wave W1 is received by the receiver 11 as the direct wave W0 without being reflected by the object 3. This in turn makes it possible to prevent a situation in which detection of the object 3 by the transmission and reception of acoustic waves becomes difficult due to the influence of a received acoustic wave.

In the object detection device 1 of the present example embodiment, the transmission signal Sd has the frequency spectrum F1 that includes the node F10 in which the intensity of a frequency component is lower than the intensities of surrounding frequency components (see FIG. 6). The transmission signal Sd is set such that the resonant frequency fr in the frequency characteristics of the receiver 11 is included in the node F10 (see FIGS. 6 and 8). This makes it possible to reduce the frequency component in the transmission signal Sd that causes the resonance of the receiver 11 and makes it easier to suppress ringing at the time of reception by the receiver 11.

In the object detection device 1 of the present example embodiment, the transmission signal Sd is set such that the resonant frequency fr is included in a node F10 at the lowest frequency among multiple nodes F10 arranged at regular intervals in the frequency spectrum F1 (see FIGS. 6 and 8). For example, this makes it possible to reduce the time length of the signal wave W1 and makes it easier for the object detection device 1 to perform an object detection operation by the transmission and reception of acoustic waves.

In the object detection device 1 of the present example embodiment, the transmission signal Sd is set to have the pulse width "2a", which is an example of a signal length indicating the time length of the signal wave W1, to reduce or prevent the resonance of the receiver 11 at the time of reception of the signal wave W1. Setting the signal length in this manner makes it possible to prevent a situation in which the detection of the object 3 becomes difficult and makes it easier to detect the object 3 by the transmission and reception of acoustic waves.

In the object detection device 1 of the present example embodiment, the transmission signal Sd includes an impulse waveform that has the pulse width "2a" set as the signal length. Controlling the transmission signal Sd in this manner facilitates the reduction or prevention of ringing of the receiver 11.

In the object detection device 1 of the present example embodiment, based on the transmission signal Sd and the reception signal Sr, the controller 13 detects, as the distance to the object 3, the distance corresponding to the period from when the signal wave W1 is transmitted by the transmitter 10 until when the signal wave W1 reflected by the object 3 is received by the receiver 11. Such a TOF ranging method facilitates the detection of the distance to the object 3 by the transmission and reception of acoustic waves. Instead of the TOF ranging method, the object detection device 1 may use any other object detection method that is based on the transmission and reception of acoustic waves.

In the object detection device 1 of the present example embodiment, the transmitter 10 is, for example, a thermophone that generates the signal wave W1 by generating heat and stopping the generation of heat. This makes it easier to prevent reverberation in the signal wave W1 to be transmitted and makes it possible to prevent a situation in which the detection of the object 3 by the transmission and reception of acoustic waves becomes difficult due to the influence of reverberation at the time of transmission.

Second Example Embodiment

A second example embodiment of the present invention is described below with reference to FIGS. 12 through 16. In the example of the detection method described in the first example embodiment, the distance to the object 3 is measured using the signal wave W1. An object detection device 1A of the second example embodiment uses the detection method of the first example embodiment in combination with another detection method.

1. Configuration

Figure 12:
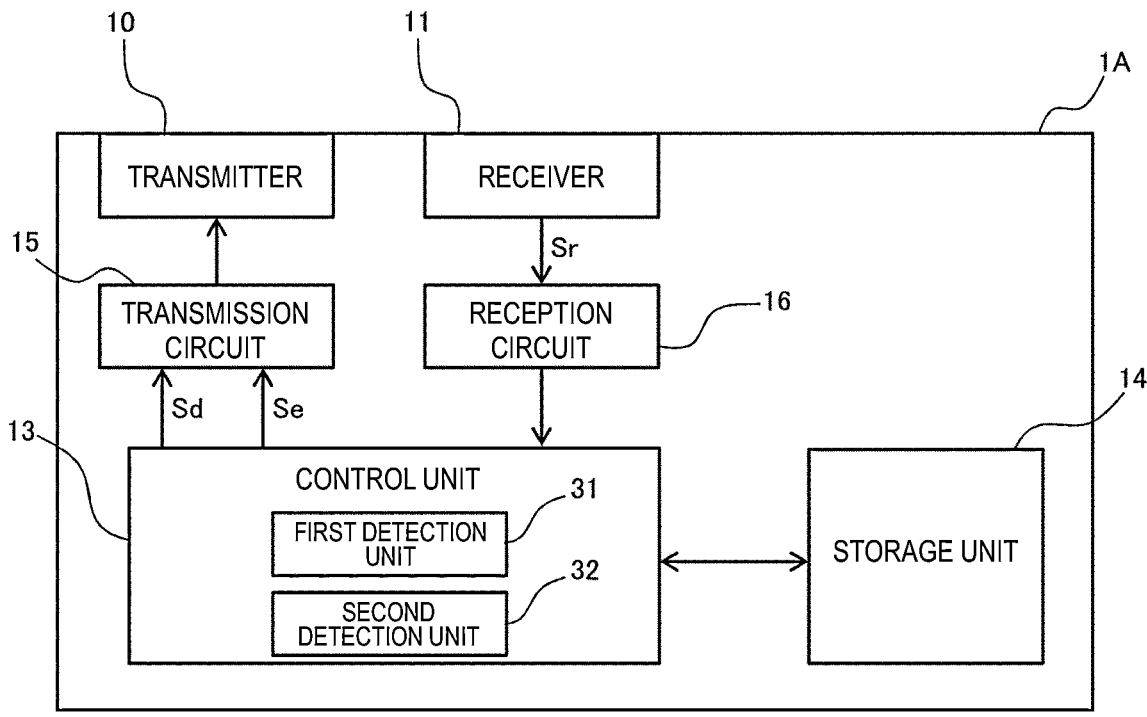
FIG. 12 is a block diagram illustrating a configuration of an object detection device according to an example embodiment of the present invention.

FIG. 12 illustrates an example of a configuration of the object detection device 1A according to the second example embodiment. The object detection device 1A of the present example embodiment has a configuration similar to the configuration of the first example embodiment. However, in the object detection device 1A, the controller 13 has a functional configuration including first and second detectors 31 and 32 that perform two different detection methods.

Similarly to the object detection device 1 of the first example embodiment, the first detector 31 detects the object 3 with a TOF ranging method by controlling the transmission and reception of the signal wave W1 based on the transmission signal Sd with an impulse waveform.

The second detector 32 detects the object 3 with a ranging method based on correlation processing by controlling the transmission and reception of the signal wave W1 based on a modulated transmission signal Se with, for example, a chirp waveform. For example, the storage 14 of the present example embodiment stores data representing the transmission signal Se with a chirp waveform. An example of the data of the transmission signal Se is illustrated in FIG. 13.

Figure 13:
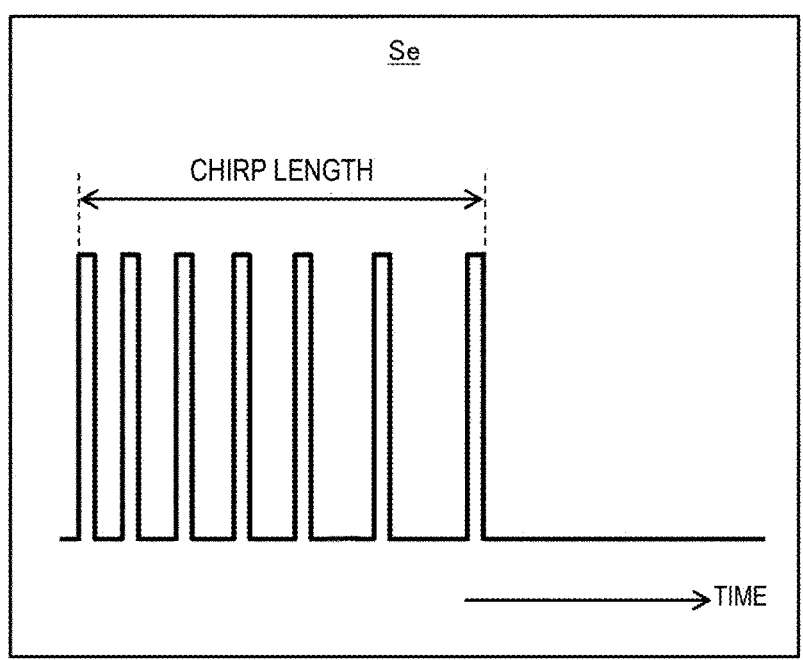
FIG. 13 is a diagram for describing a transmission signal of an object detection device according to an example embodiment of the present invention.

FIG. 13 illustrates an example of a signal waveform of the transmission signal Se to generate a down-chirp signal wave W1 in pulse-interval modulation. With the transmitter 10 defined by a thermophone, heat generation and power consumption can be easily reduced or prevented by maintaining a short pulse width using, for example, pulse-interval modulation.

The modulation method used by the second detector 32 to modulate the transmission signal Se is not limited to the above example. For example, a modulation method using an up-chirp signal or a spread code such as an M-sequence code may also be used. Also, for example, pulse-width modulation may be used instead of pulse-interval modulation. Furthermore, for example, amplitude modulation may be performed instead of frequency modulation.

Figure 14:
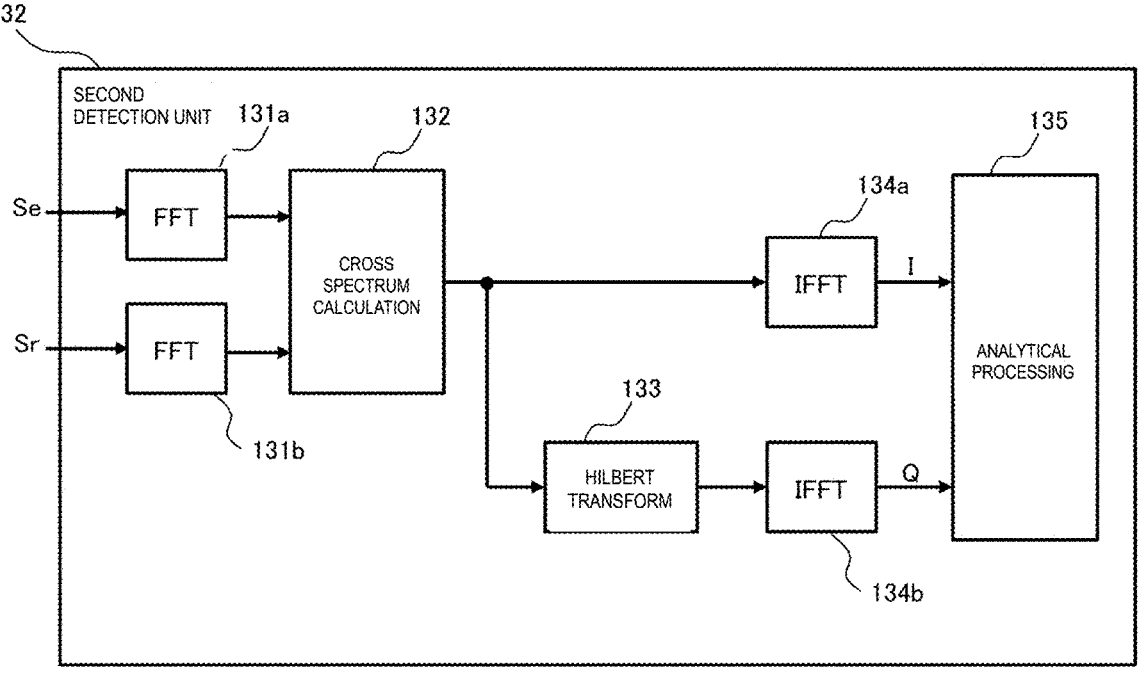
FIG. 14 is a block diagram illustrating an example of a configuration of a second detector of an object detection device according to an example embodiment of the present invention.

FIG. 14 is a block diagram illustrating an example of a configuration of the second detector 32. The second detector 32 includes, for example, fast Fourier transformers (FFT) 131a and 131b, a cross spectrum calculator 132, a Hilbert transformer 133, inverse Fourier transformers (IFFT) 134a and 134b, and an analytical processor 135 as functional units. In the descriptions below, the FFTs 131a and 131b are collectively referred to as FFTs 131, and the IFFTs 134a and 134b are collectively referred to as IFFTs 134.

The second detector 32 receives, for example, the transmission signal Se from the storage 14 and the reception signal Sr from the reception circuit 16 and performs signal processing with the functional units 131-135. Each of the functional units 131-135 is able to operate at an interval of, for example, a predetermined frame period (e.g., about 1/30 second). For example, processes using functional units from the FFTs 131 through the IFFTs 134 are performed to generate an analysis signal based on the transmission signal Se and the reception signal Sr for each frame. The analysis signal is formed by a cross-correlation function between the transmission signal Se and the reception signal Sr. The cross-correlation function indicates the correlation between the two signals Se and Sr in the time domain.

The FFT 131a performs the fast Fourier transform on the transmission signal Se input to the second detector 32 to transform the transmission signal Se from the time domain to the frequency domain and outputs the transformation result to the cross spectrum calculator 132. The FFT 131*b* performs calculations, which are similar to the calculations performed by the FFT1 121*a*, on the reception signal Sr input to the second detector 32 and outputs the transformation result to the cross spectrum calculator 132.

The cross spectrum calculator 132 calculates a cross spectrum from the results of the Fourier transform performed on the signals Se and Sr by the FFTs 131 and outputs the calculation result to the IFFT 134*a* and the Hilbert transform unit 133. The cross spectrum corresponds to a frequency component obtained by performing the Fourier transform on the cross-correlation function between the transmission signal Se and the reception signal Sr.

The IFFT 134*a* performs the inverse fast Fourier transform on the input cross spectrum and outputs a signal I, which indicates a result of transformation from the frequency domain back to the time domain, to the analytical processor 135. The output signal I (hereafter also referred to as an "in-phase component I") indicates a cross-correlation function between the transmission and reception signals Se and Sr.

The Hilbert transformer 133 performs the Hilbert transform on the input cross spectrum and outputs a transformation result, in which each frequency component of the cross spectrum is shifted by π/2, to the IFFT 134*b*.

The IFFT 134*b* performs calculations, which are similar to those performed by the IFFT 134*a*, on the cross spectrum on which the Hilbert transform has been performed, and outputs a signal Q indicating the transformation result to the analytical processor 135. The output signal Q (hereafter also referred to as an "orthogonal component Q") is orthogonal to the in-phase component I.

The analytical processor 135 generates an analysis signal having the in-phase component I as the real part and the orthogonal component Q as the imaginary part and performs a process related to the analysis signal. The analysis signal generated as described above based on the transmission signal Se and the reception signal Sr indicates an analytical function in the complex domain (see FIG. 16).

The functional configuration of the second detector 32 is not limited to that described above. For example, in the second detector 32, the cross-correlation function may be calculated by, for example, a product-sum operation directly from the transmission and reception signals Se and Sr, instead of the process in which the cross spectrum is calculated after the Fourier transform and then the inverse Fourier transform is performed. Also, in the second detector 32, the analysis signal may be generated by, for example, an orthogonal detection function, instead of the Hilbert transform.

2. Operations

Operations of the object detection device 1A of the second example embodiment are described below.

The object detection device 1A of the present example embodiment activates the first detector 31 when detecting the object 3 at a relatively short distance and activates the second detector 32 when detecting even the object 3 at a long distance. Thus, by changing detection methods according to the distance to an object to be detected, the object detection device 1A of the present example embodiment can perform an energy-efficient object detection operation over a wide range from a short distance to a long distance.

Figure 15:
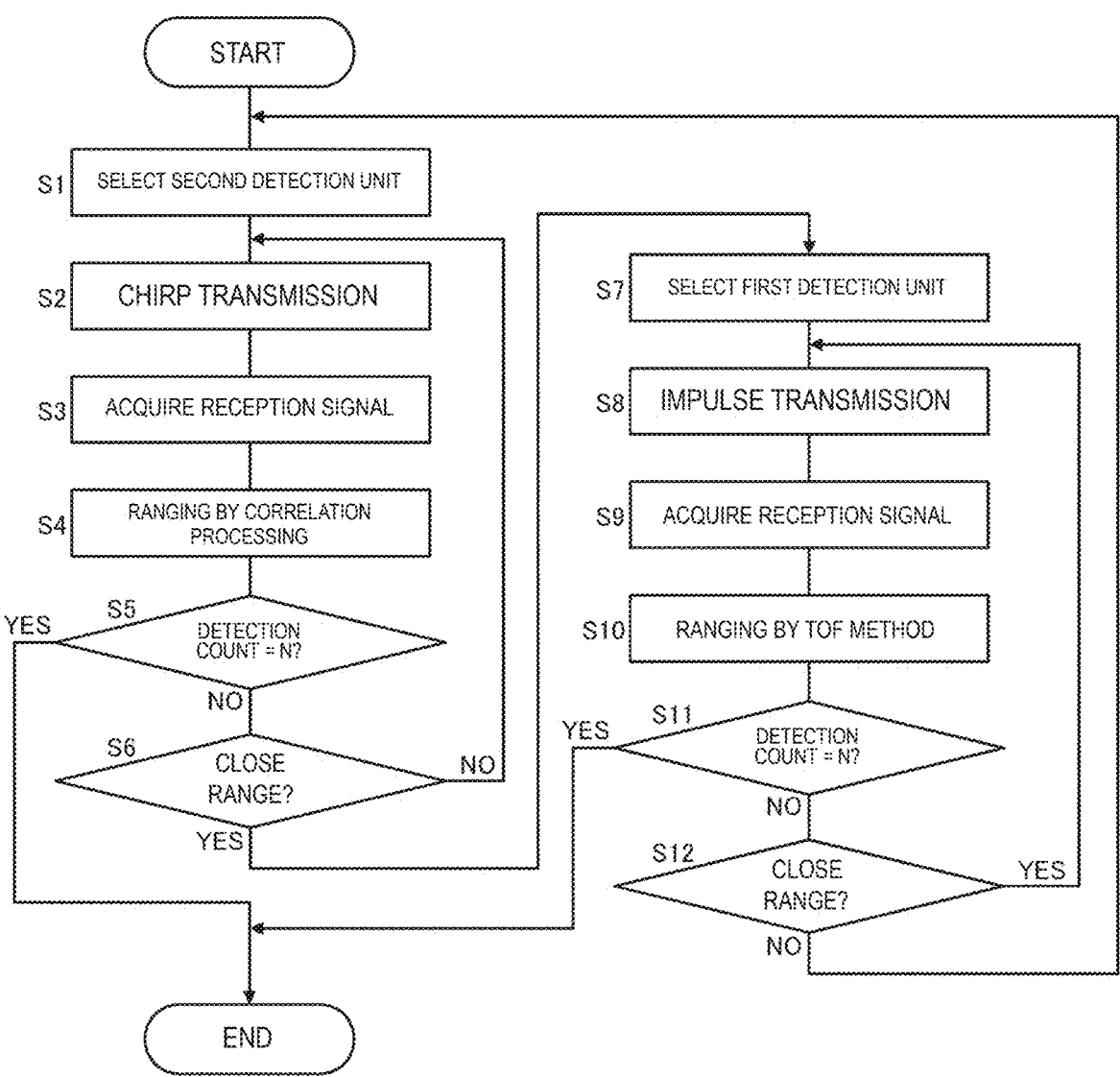
FIG. 15 is a flowchart illustrating an example of an operation of an object detection device according to an example embodiment of the present invention.

FIG. 15 is a flowchart illustrating an example of an operation of the object detection device 1A according to the present example embodiment. In the example of the operation described below, the object detection device 1A detects the distance to the object 3 a predetermined number of times N. The process illustrated in the flowchart is started, for example, in a state in which a detection count n being managed in the storage 14 is set to "0" and is performed by the controller 13 of the object detection device 1A.

First, the controller 13 selects the second detector 32 of the first and second detectors 31 and 32 (S1). As a result of the selection at step S1, the object detection device 1A is set to an operation mode (i.e., a long-range mode) in which even the object 3 at a long distance can be detected.

In the long-range mode, the controller 13 defines and functions as the second detector 32 and controls chirp transmission of the signal wave W1 from the transmitter 10 (S2). In the control of the chirp transmission (S2), the controller 13 generates the transmission signal Se with the chirp waveform and supplies the transmission signal Se to the transmission circuit 15. When driven by the transmission circuit 15 according to the transmission signal Se, the transmitter 10 generates a chirp-modulated signal wave W1.

Also, the controller 13 defining and functioning as the second detector 32 acquires the reception signal Sr indicating the reception result of the receiver 11 via, for example, the reception circuit 16 (S3). The receiver 11 receives acoustic waves including the reflected wave W2 of the signal wave W1 transmitted by the chirp transmission in a given frame period and thus generates the reception signal Sr.

Next, based on the transmission signal Sd with the chirp waveform and the acquired reception signal Sr, the second detector 32 of the controller 13 calculates the distance to the object 3 by performing correlation processing between the signals Sd and Sr (S4). For example, the second detector 32 performs calculations corresponding to the functional units 131-135 in each frame period to generate an analysis signal indicating the result of analyzing the correlation between the transmission signal Sd and the reception signal Sr in the frame period.

Figure 16:
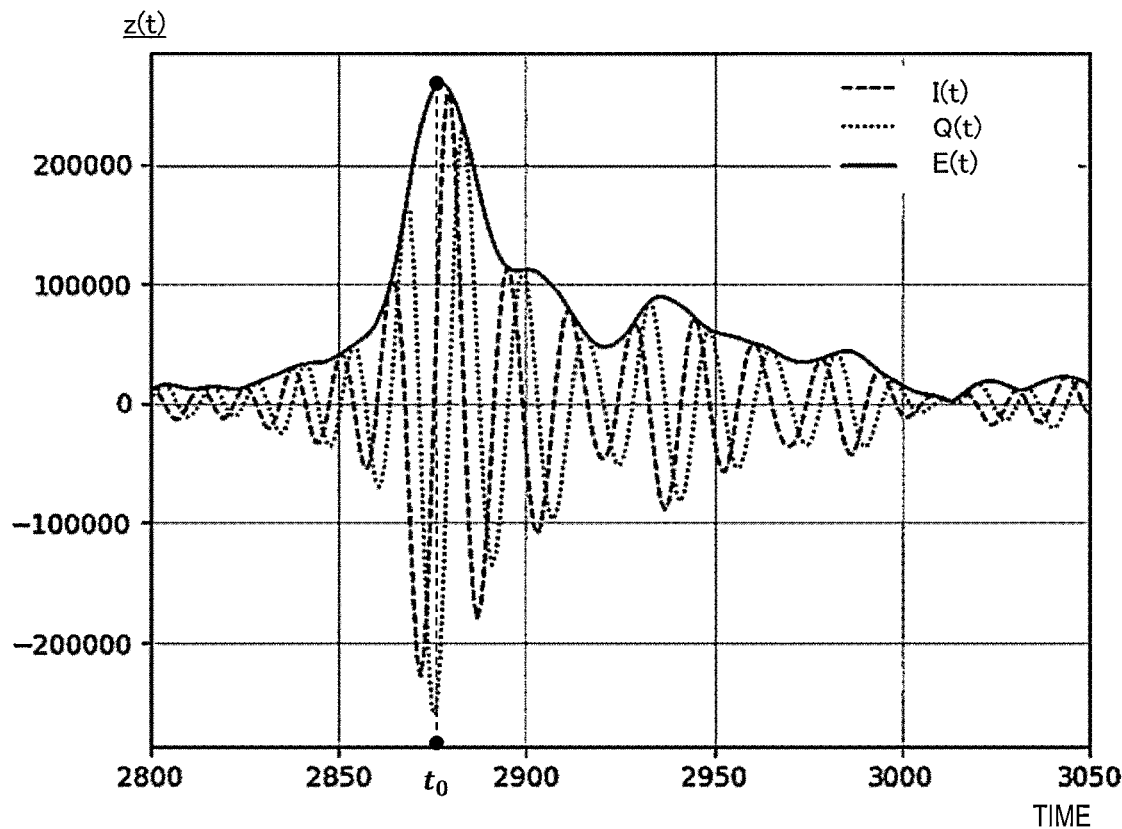
FIG. 16 is a graph for describing an analysis signal in an object detection device according to an example embodiment of the present invention.

FIG. 16 is a graph for describing an analysis signal z(t) in the second detector 32. FIG. 16 shows an example of the analysis signal z(t) corresponding to one frame. The analysis signal z (t) has a complex value range including a real part that is the in-phase component I (t) representing the cross-correlation function between the transmission signal Sd and the reception signal Sr and an imaginary part that is the corresponding orthogonal component Q (t).

At step S4, the second detector 32 detects a peak time to by obtaining, for example, an envelope E(t)=|z(t)| of the analysis signal z(t). The peak time to indicates the timing at which an amplitude |z(t)| becomes maximum in the analysis signal z(t) corresponding to one frame. Thus, by analyzing the timing corresponding to the time of reflection by the object 3 in the transmission and reception of the signal wave W1 in the corresponding frame, it is possible to measure, for example, the propagation time taken by the transmitted signal wave W1 to be received as the reflected wave W2 from the object 3.

With the analysis of the correlation processing as described above, the second detector 32 can accurately detect the distance to the object 3 based on the propagation time of the reflected wave W2 arrived from the object 3 (S4). Also, with the ranging performed at step S4, even when the reception times of multiple acoustic waves partially overlap each other, it is possible to distinguish the acoustic waves and detect the corresponding object 3 by performing the correlation processing over the chirp waveform in the frame period.

Referring back to FIG. 15, the controller 13, for example, increments the detection count n and determines whether the current detection count n has reached the predetermined number of times N (S5). When the current detection count n has not reached the predetermined number of times N (NO in S5), the controller 13, for example, determines whether the object 3 is located at a short distance that is less than a predetermined distance (S6) based on the distance calculated by the correlation processing (S4). The predetermined distance is set as a threshold to determine whether the object 3 is at a short distance based on, for example, a distance range within which the first detector 31 can accurately detect the object 3.

When determining that the object 3 is not at a short distance (NO in S6), the controller 13, as the second detector 32, repeats the process starting from step S2. That is, the object detection device 1A continues to operate in the long-range mode.

On the other hand, when determining that the object 3 is at a short distance (YES in S6), the controller 13 selects the first detector 31 of the first and second detectors 31 and 32 (S7). As a result of the selection at step S7, the object detection device 1A is set to an operation mode (i.e., a close-range mode) in which the object 3 at a short distance can be efficiently detected.

In the close-range mode, the controller 13 defines and functions as the first detector 31 and controls the impulse transmission of a signal wave (S8). In the control of the impulse transmission (S8), the controller 13 supplies the transmission signal Sd, which is the same as or similar to that in the first example embodiment, to the transmission circuit 15 to cause the transmitter 10 to transmit the signal wave W1 with the impulse waveform.

Also, the controller 13 defining and functioning as the first detector 31 acquires the reception signal Sr including the reception result of the reflected wave W2 received by the receiver 11 (S9) and calculates the distance to the object 3 reflecting the reflected wave W2 according to the TOF ranging method (S10). The operation of the object detection device 1A in steps S8 through S10 is the same as or similar to the operation of the object detection device 1 in the first example embodiment.

Also, for example, similarly to step S5, the controller 13 increments the detection count n and determines whether the current detection count n has reached the predetermined number of times N (S11). When the current detection count n has not reached the predetermined number of times N (NO in S11), similarly to, for example, step S6, the controller 13 determines whether the object 3 is at a short distance (S12) based on the distance calculated by the TOF method (S10).

When determining that the object 3 is at a short distance (YES in S12), the controller 13 defines and functions as the first detector 31 and repeats the process starting from step S8. That is, the object detection device 1A continues to operate in the close-range mode.

On the other hand, when it is determined that the object 3 is not at a short distance (NO in S12), the process returns to step S1. That is, the object detection device 1A is set to the long-range mode again and repeats the process starting from step S2.

When the current detection count n reaches the predetermined number of times N (YES in S5 or S11), the controller 13 ends the process illustrated in the flowchart.

In the above-described operation of the object detection device 1A of the present example embodiment, the first detector 31 is used for the close-range mode and the second detector 32 is used for the long-range mode. The second detector 32 can detect the object 3 over a range from a short distance to a long distance by the chirp transmission (S2) and the ranging based on correlation processing (S4). Here, the chirp transmission (S2) transmits a large number of pulses each time and therefore consumes a relatively large amount of power. Also, the ranging based on correlation processing (S4) requires a relatively high computational load.

For the above reasons, the object detection device 1A of the present example embodiment uses the first detector 31 instead of the second detector 32 when the object 3 is at a short distance. Because the first detector 31 performs the impulse transmission (S8) instead of the chirp transmission (S2), the power consumption at the time of transmission can be reduced. Also, because the ranging based on the TOF method (S10) is performed instead of the ranging based on correlation processing (S4), the computational load can also be reduced. Thus, the object detection device 1A of the present example embodiment can perform energy-efficient object detection over a wide range from a short distance to a long distance.

As described in the first example embodiment, the direct wave W0 may influence the detection in the close-range mode of the object detection device 1A. For this reason, in the impulse transmission (S8) in the close-range mode of the object detection device 1A of the present example embodiment, the pulse width "2a" of the transmission signal Sd is set in a manner the same as or similar to the first example embodiment. This makes it possible to reduce the influence of the direct wave W0 and improve the accuracy of the close-range detection.

Also, in the object detection device 1A of the present example embodiment, it is not necessary to apply the setting of the first example embodiment to the pulse width of each of multiple pulses in the chirp transmission (S2), and, for example, a relatively narrow pulse width may be used for each of the multiple pulses. This makes it possible to reduce the power consumption during the chirp transmission (S2). Even in this case, it is possible to distinguish between the direct wave W0 and the reflected wave W2 overlapping each other and to accurately perform object detection by the ranging based on correlation processing (S4).

3. Summary

As described above, in the object detection device 1A of the present example embodiment, the controller 13 determines whether the object 3 is located at a short distance that is less than the predetermined distance (S6, S12). When determining that the object 3 is at a short distance (YES in S6 or S12), the controller 13 generates, as a first transmission signal Sd, the transmission signal Sd that is set to reduce or prevent the resonance of the receiver 11 caused by the reception of the signal wave W1 (S8). When determining that the object 3 is not at a short distance (NO in S6 or S12), the controller 13 generates a second transmission signal Se different from the first transmission signal Sd (S2). This makes it possible to use different transmission signals Sd and Se to generate the signal wave W1 depending on whether the object 3 is at a close distance and thus makes it possible to efficiently perform object detection.

In the object detection device 1A of the present example embodiment, the controller 13 causes the transmitter 10 to transmit the signal wave W1 according to the second transmission signal Se (S2) and performs correlation processing based on the reception signal Sr, which indicates the reception result of the receiver 11 after the transmission of the signal wave W1, to detect the distance to the object 3 (S4).

This enables the object detection device 1A to accurately perform object detection using the correlation processing.

Other Example Embodiments

In the second example embodiment described above, a calculation using a complicated cross-correlation function is used as an example of a calculation performed by the second detector 32 of the object detection device 1A. However, the calculation performed by the second detector 32 is not limited to this example. As another example, the object detection device 1 of the present example embodiment may use a cross-correlation function that is not as complicated. For example, the second detector 32 may calculate the distance to the object 3 by detecting the peak of the signal I in the real part instead of detecting the peak of the envelope E(t). In this case, for example, the Hilbert transformer 133 and the subsequent IFFT 134*b* may be omitted from the functional configuration of the controller 13.

Also, the second detector 32 may analyze a phase angle z(t) in addition to the envelope E(t) in the analysis signal z(t) obtained by complicating the cross-correlation function and may calculate, for example, a phase difference between consecutive frames. For example, this makes it possible to accurately detect a small displacement of the object 3.

Also, although the pulse width "2a" is used as an example of the signal length of the transmission signal Sd in the above example embodiments, the signal length to be set in the object detection device 1 of the present example embodiment is not limited to this example. For example, although a rectangular or substantially rectangular wave with the pulse width "2a" is shown in FIG. 5 as the signal waveform of the transmission signal Sd, the signal waveform of the transmission signal Sd is not limited to the rectangular or substantially rectangular wave and may be, for example, a triangular or substantially triangular wave. In the present example embodiment, a setting similar to the setting of the pulse width "2a" described above is applicable to any signal length indicating the time length of the signal wave W1 in the transmission signal Sd regardless of the details of the signal waveform of the transmission signal Sd.

Also, in the object detection device 1 of the present example embodiment, the parameter for setting the transmission signal Sd is not necessarily limited to the signal length. In the present example embodiment, the waveform of the transmission signal Sd is not limited to the impulse waveform and may include two or more pulses, for example. In this case, the setting of the transmission signal Sd considering the frequency characteristics of the receiver 11 as in the above example embodiments may be applied to the pulse width of each pulse or to the total time length of the multiple pulses. Also, the period of multiple pulses may be set considering the frequency characteristics of the receiver 11. Furthermore, the waveform of the transmission signal Sd is not limited to a pulse waveform but may be a continuous waveform such as a sine wave, for example.

In the above example embodiments, it is assumed that the transmitter 10 is, for example, a thermophone. However, in the present example embodiment, the transmitter 10 is not limited to a thermophone. For example, the transmitter 10 may be any type of acoustic wave generator, such as a piezoelectric resonant ultrasonic transducer. The transmitter 10 of the present example embodiment may be any type of non-directional sound source that does not have directivity. The transmitter 10 may be a variable or fixed directivity sound source. For example, even when an acoustic wave generator that is inferior to a thermophone in reverberation characteristics is used for the transmitter 10, the influence of ringing due to the reception of the direct wave W0 can be reduced or prevented by setting the transmission signal Sd in a manner the same as or similar to the first example embodiment. Accordingly, this configuration also makes it possible to prevent a situation in which the detection of an object by the transmission and reception of acoustic waves becomes difficult due to the influence of a received acoustic wave.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An object detection device to detect an object by transmitting and receiving an acoustic wave, the object detection device comprising:

a transmitter to generate the acoustic wave as a signal wave based on a predetermined transmission signal and transmit the signal wave toward the object;

a receiver provided separately from the transmitter and to receive the acoustic wave to generate a reception signal; and a controller configured or programmed to generate the transmission signal to control the signal wave transmitted from the transmitter; wherein the receiver has frequency characteristics such that the reception signal fluctuates when the receiver resonates; and the transmission signal is set according to the frequency characteristics of the receiver to reduce or prevent resonance of the receiver at a time of reception of the signal wave from the transmitter.

2. The object detection device according to claim 1, wherein the transmission signal has a frequency spectrum including a node in which an intensity of a frequency component is less than intensities of surrounding frequency components; and the transmission signal is set such that a resonant frequency in the frequency characteristics of the receiver is included in the node.

3. The object detection device according to claim 2, wherein the transmission signal is set such that the resonant frequency is included in the node at a lowest frequency among multiple nodes provided at regular intervals in the frequency spectrum.

4. The object detection device according to claim 1, wherein the transmission signal is set to have a signal length indicating a time length of the signal wave so that the resonance of the receiver at the time of reception of the signal wave is reduced or prevented.

5. The object detection device according to claim 4, wherein the transmission signal has an impulse waveform with a pulse width set as the signal length.

6. The object detection device according to claim 1, wherein, based on the transmission signal and the reception signal, the controller is configured or programmed to detect, as a distance to the object, a distance corresponding to a period from when the signal wave is transmitted from the transmitter until when the signal wave reflected by the object is received by the receiver.

7. The object detection device according to claim 1, wherein the controller is configured or programmed to:

determine whether the object is at a short distance less than a predetermined distance;

generate, as a first transmission signal, the transmission signal that is set to reduce or prevent the resonance of the receiver resulting from the reception of the signal wave when it is determined that the object is at the short distance; and generate a second transmission signal different from the first transmission signal when it is determined that the object is not at the short distance.

8. The object detection device according to claim 7, wherein the controller is configured or programmed to cause the transmitter to transmit the signal wave according to the second transmission signal and perform correlation processing based on the reception signal, which indicates a reception result of the receiver after the transmission of the signal wave, to detect a distance to the object.

9. The object detection device according to claim 1, wherein the transmitter includes a thermophone to generate the signal wave by generating heat and stopping the generation of heat.

10. The object detection device according to claim 1, wherein the receiver includes a micro electro-mechanical systems microphone.

11. The object detection device according to claim 1, further comprising a reception circuit including a sensor amplifier to amplify the reception signal from the receiver and output the reception signal.

12. The object detection device according to claim 1, wherein the controller includes a microcomputer.

13. The object detection device according to claim 1, further comprising a storage to store at least one of data or programs read by the controller.

14. The object detection device according to claim 13, wherein the storage is a flash memory.

* * * * *